UNITED STATES PATENT OFFICE.

ALONZO H. WEST, OF HAMILTON, NEW YORK.

IMPROVEMENT IN SOAPS.

Specification forming part of Letters Patent No. 204,116, dated May 21, 1878; application filed March 23, 1878.

*To all whom it may concern:*

Be it known that I, ALONZO H. WEST, of Hamilton, in the county of Madison and State of New York, have invented a new and valuable Improvement in Soaps; and I do hereby declare that the following is a full, clear, and exact description of the same.

My invention relates to the manufacture of soap; and it consists in the novel combination of stone-lime, sal-soda, soft water, tallow, borax, marble-dust, glycerine, lard, ammonia, and gum-arabic, substantially as hereinafter set forth.

In forming my compound I first take twelve and one-half pounds of stone-lime in a slaked condition and twenty-five pounds of sal-soda, and place them in about seventy quarts of soft water. I boil these ingredients in a proper vessel until they are properly united, and then permit them to settle, so that all gross impurities may be removed. I next pour the boiled liquor, except the débris, into another receptacle for boiling, and add twenty-seven pounds of tallow and one pound of borax. I then boil the mass until the tallow and borax are dissolved and united with the other ingredients, and then, while the fluid is still hot, I add ninety quarts of marble-dust, one-half ounce of glycerine, one large spoonful of lard, one ounce of ammonia, and two ounces of white gum-arabic.

The preparation is ready for use as soon as the last-named ingredients are dissolved and distributed through the fluid, and the mass is properly cooled.

I am aware that tallow, sal-soda, borax, and lime have been used in the manufacture of soap, and lay no claim to those ingredients.

What I claim as new, and desire to secure by Letters Patent, is—

The improved soap herein described, formed by the combination of lime, sal-soda, water, tallow, borax, marble-dust, glycerine, lard, ammonia, and gum-arabic, substantially in the manner and proportions herein specified.

In testimony that I claim the above I have hereunto subscribed my name in the presence of two witnesses.

ALONZO H. WEST.

Witnesses:
L. C. DEAN,
F. S. BONNEY.